(12) United States Patent
Dixit

(10) Patent No.: US 11,461,960 B2
(45) Date of Patent: Oct. 4, 2022

(54) REFLECTION RENDERING IN COMPUTER GENERATED ENVIRONMENTS

(71) Applicant: Citrix Systems, Inc., Fort Lauderdale, FL (US)

(72) Inventor: Pawan Kumar Dixit, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 17/222,027

(22) Filed: Apr. 5, 2021

(65) Prior Publication Data
US 2021/0358203 A1    Nov. 18, 2021

(30) Foreign Application Priority Data
May 14, 2020    (IN) .......................... IN202041020351

(51) Int. Cl.
*G06T 15/50* (2011.01)
*G06T 15/20* (2011.01)
*G06T 15/06* (2011.01)
*H04L 67/131* (2022.01)

(52) U.S. Cl.
CPC .......... *G06T 15/506* (2013.01); *G06T 15/06* (2013.01); *G06T 15/205* (2013.01); *H04L 67/131* (2022.05); *G06T 2200/16* (2013.01)

(58) Field of Classification Search
CPC .................................................. G06T 19/006
See application file for complete search history.

(56) References Cited

U.S. PATENT DOCUMENTS

| 2018/0324229 | A1* | 11/2018 | Ross | H04L 65/4015 |
| 2019/0362539 | A1* | 11/2019 | Kurz | G06T 19/006 |
| 2021/0035356 | A1* | 2/2021 | Castaneda | H04L 65/605 |

OTHER PUBLICATIONS

Feb. 3, 2022—(WO) International Search Report and Written Opinion—App PCT/US2021/032244.
Rohmer, et al., "Interactive Near-Field Illumination for Photorealistic Augmented Reality with Varying Materials on Mobile Devices," IEEE Transactions on Visualization and Computer Graphics, IEEE Service Center, vol. 21, No. 12, Dec. 1, 2015, pp. 1349-1362.

(Continued)

*Primary Examiner* — Ryan McCulley
(74) *Attorney, Agent, or Firm* — Banner & Witcoff, Ltd.

(57) ABSTRACT

Methods and systems for remote rendering of extended reality (XR) objects are described herein. A server may receive an image of a physical environment. The image may include different views of the physical environment around a client device. The server may render at least one surface of a virtual object based on the different views of the physical environment. The at least one surface may include a reflection of another object of the physical environment from a view point of the client device at the time the image was taken. The server may generate graphics including the rendered at least one surface. The server may send the generated graphics to the client device to enable display of a computer generated environment on the client device. The computer generated environment may include the at least one virtual object with an appearance of a reflective surface.

20 Claims, 6 Drawing Sheets

(56) References Cited

OTHER PUBLICATIONS

Steinicke, et al., "Virtual Reflections and Virtual Shadows in Mixed Reality Environments," ICIAP: International Conference on Image Analysis and Processing, 17th International Confernce, Sep. 9-13, 2013, pp. 1018-1021.

Schneider, et al., "Augmented Reality Based on Edge Computing Using the Example of Remote Live Support," 2017 IEEE International Conference on Industrial Technology (ICIT), IEEE, Mar. 22, 2017, pp. 1277-1282.

Woodward, et al., "A Client/Server Architecture for Augmented Assembly on Mobile Phones," Jan. 1, 2010, retrieved from <<https://www.researchgate.net/profile/Mark_Billinghurst/publication/257133261_A_ClientServer_Architecture_for_Augmented_Assembly_on_Mobile_Phones/links/0046352464b612d85d000000/A-Client-Server-Architecture-for-Augmented-Assembly-on-Mobile-Phones.pdf>>, 17 pages.

* cited by examiner

REFLECTION RENDERING IN COMPUTER GENERATED ENVIRONMENTS

CROSS-REFERENCE TO RELATED APPLICATIONS

This application claims priority to Indian Provisional Application No. 202041020351, entitled Reflection Rendering in Computer Generated Environments, filed May 14, 2020.

FIELD

Aspects described herein generally relate to extended reality, such as augmented reality, virtual reality, and mixed reality, graphics rendering, 3D modeling, server-side rendering, and hardware and software related thereto. More specifically, one or more aspects describe herein provide for server-side rendering of reflections in extended reality environments.

BACKGROUND

Computing devices may generate two- and three-dimensional environments for display on a display device, such as a computer monitor. Generation of three-dimensional environments may entail rendering one or more polygons and texturing such polygons with one or more images. To improve the quality of such three-dimensional environments, lighting effects, such as reflections and shadows, may be simulated. For example, a three-dimensional environment might simulate a light source, and virtual objects in that environment might cast shadows based on their position relative to the light source, and/or may appear to reflect all or portions of the light source if desired. Such three-dimensional environments may be all or portions of an extended reality environment, such as a virtual reality environment, which allow users to look and/or travel around the three-dimensional environment.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

The graphical quality of extended reality (XR) environments (e.g., virtual reality environments, augmented reality environments, and/or mixed reality environments) can be dependent on the processing capabilities of the device(s) providing those environments. For example, some extended reality environments are provided by mobile devices, such as smartphones, but, because those mobile devices often have limited processing capabilities, those environments generally have a low graphical quality and are displayed with a low frame rate. As another example, high-quality, realistic, high frame rate XR environments are generally provided by XR headsets driven by standalone personal computers with powerful processors (e.g., one or more powerful video cards), but such setups can be prohibitively expensive. Whereas a user may already have a smartphone and might spend a relatively low amount of money on a headset for that smartphone, a standalone personal computer-driven virtual reality setup can be significantly more expensive in that it might require a powerful (and expensive) video card to be installed in the personal computer, may require that a user purchase a robust headset with display devices and optics, and may require that the user purchase devices such as motion controllers, motion detecting devices (sometimes referred to as "lighthouses"), and the like.

To overcome limitations described above, and to overcome other limitations that will be apparent upon reading and understanding the present specification, aspects described herein are directed towards remote rendering of reflections of objects in XR environments.

A server may receive, from a client device, an image of a physical environment, the image including different views of the physical environment around the client device. The server may render at least one surface of a virtual object based on the different views of the physical environment, the at least one surface including a reflection of another object of the physical environment from a view point of the client device at a time the image was taken. The server may generate graphics that include the rendered at least one surface of the virtual object of the received image. The server may send the generated graphics to the client device to enable display of a computer generated environment on the client device, the computer generated environment including the at least one virtual object with an appearance of a reflective surface.

A server may receive, from a client device displaying an XR environment, one or more images of a physical environment around the client device. The server may apply the one or more images to virtual environment such that the virtual environment depicts the physical environment around the client device. The server may generate one or more bitmaps of an XR object by performing steps such as rendering the XR object in the virtual environment; and simulating reflections of the virtual environment on at least a portion of the XR object so that the XR object appears to reflect at least a portion of the physical environment around the client device. The server may send, to the client device, the one or more bitmaps for rendering in the XR environment on the client device.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
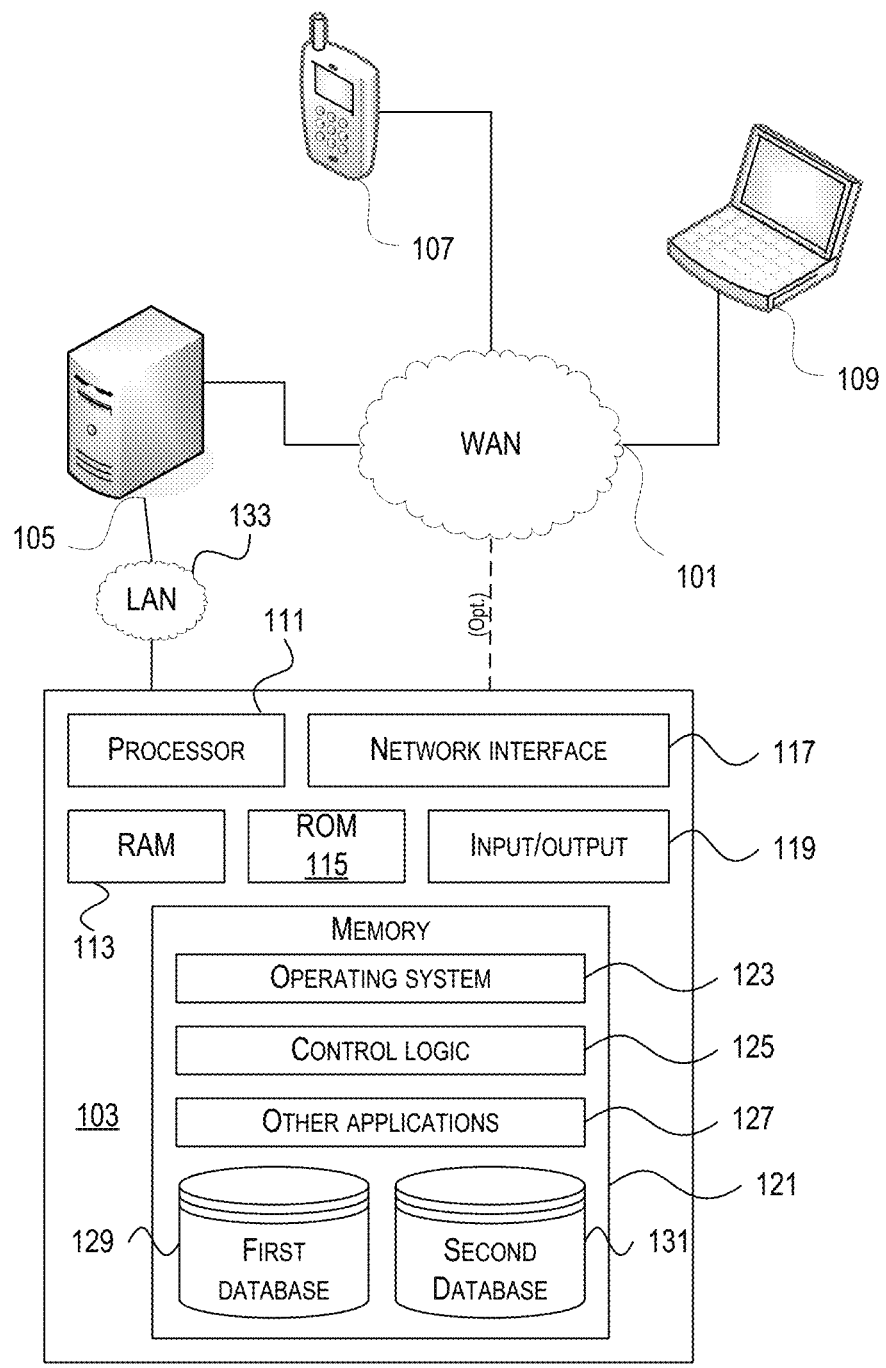
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards displaying XR environments. An XR device, such as a headset, smartphone, or the like, may be configured to present an XR environment to one or more users. For example, a user might insert their smartphone into a headset which suspends a screen of the smartphone in front of their eyes, and images may be displayed to the user. Such XR environments may comprise one or more real objects (e.g., as captured via a camera and reproduced on the screen of an XR headset) and one or more virtual objects (e.g., two- or three-dimensional objects which are generated by one or more computing devices and displayed on the screen of the XR headset).

The generation of virtual objects may be performed by a local XR device, such as a user's smartphone, or by a remote device, such as a server communicatively coupled to the local XR device. One strategy for minimizing the impact limited device processing power can have on XR environments is to render all or portions of the XR environments on a relatively more powerful remote server. While this strategy may leverage the comparatively better processing power of the remote server (as compared to, e.g., a relatively weaker client device), this strategy may be difficult to implement, especially because network conditions can dramatically impact the XR environment. Moreover, rendering an XR environment remotely may be cumbersome in that such rendering may lack context information about a physical environment about the XR device. For example, remote rendering in an augmented reality environment where portions of a physical environment are shown alongside virtual objects can cause the virtual objects to look particularly fake in comparison to the physical environment. That said, remote rendering has numerous advantages. For example, remote rendering may lower the storage requirements on client devices to present XR environments, such that the client device need not store a large quantity of high-quality 3D models, textures, or the like.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," and similar terms, is meant to include both direct and indirect mounting, connecting, and coupling.

Computing Architecture

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
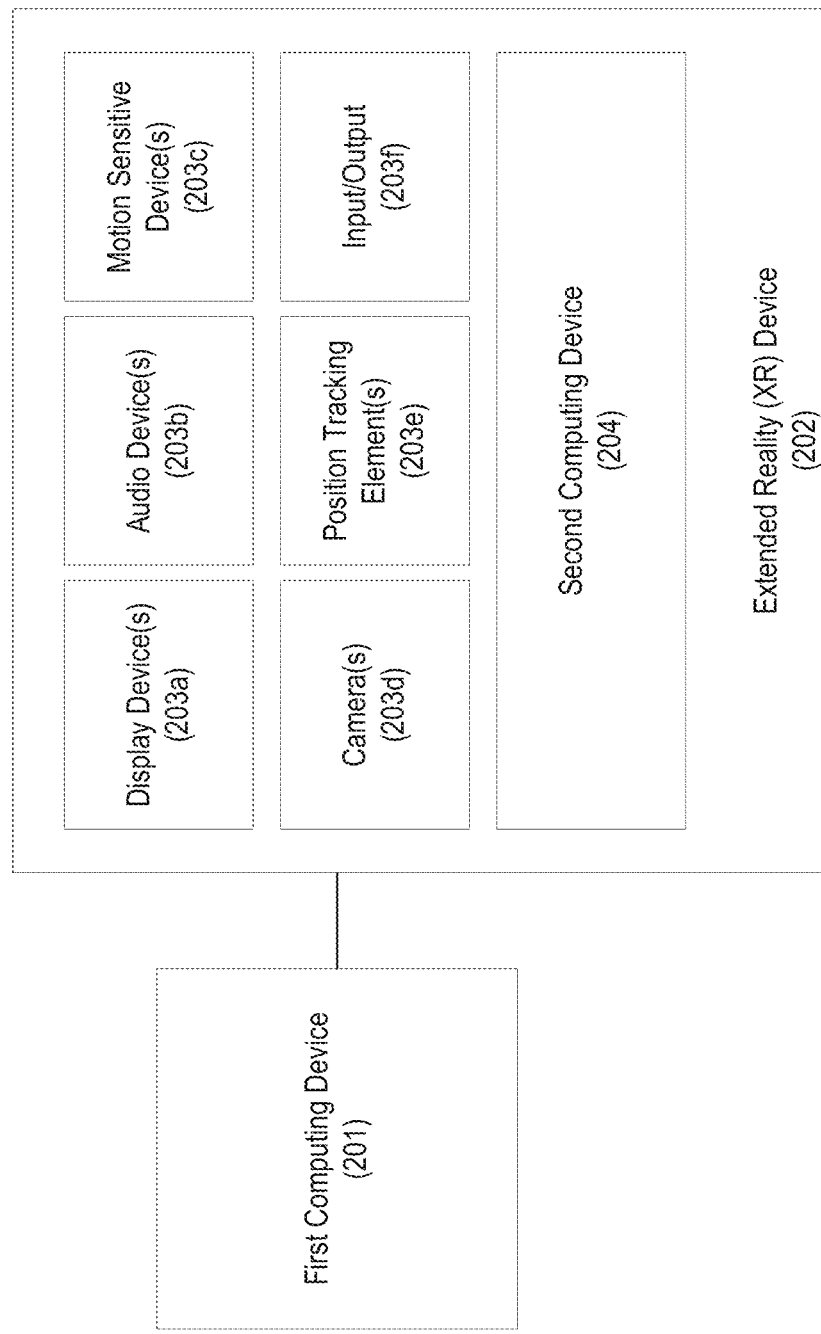
FIG. 2 depicts an illustrative extended reality (XR) device.

FIG. 2 depicts an example of an XR device 202. The XR device 202 may be configured to provide a XR environment (e.g., a VR, AR, and/or MR environment). The XR device 202 may be communicatively connected to a first computing device 201, which may be the same or similar as one or more of the devices 103, 105, 107, and 109. The XR device 202 may comprise a plurality of different elements, such as display devices 203a, audio devices 203b, motion sensitive devices 203c, cameras 203d, position tracking elements 203e, and input/output 203f. Such elements may additionally and/or alternatively be referred to as sensors. Other such elements, not shown, may include in-ear electroencephalographic (EEG) and/or heart rate variability (HRV) measuring devices, scalp and/or forehead-based EEG and/or HRV measurement devices, eye-tracking devices (e.g., using infrared), or the like. The XR device 202 may further comprise a second computing device 204, which may be the same or similar as the devices 103, 105, 107, and 109. Not all elements shown in FIG. 2 need to be present for operation of the XR device 202. For example, the XR device 202 might not have the cameras 203d. As another example, the XR device 202 might lack a second computing device 204, such that the first computing device 201 may directly interface with the display devices 203a, the audio devices 203b, the motion sensitive devices 203c, the cameras 203d, the position tracking elements 203e, and/or the input/output 203f to provide an XR environment. As yet another example, the second computing device 204 may be sufficiently powerful enough such that the first computing device 201 may be omitted.

The first computing device 201 and/or the second computing device 204 need not have any particular processing power or functionality to provide an XR environment. The first computing device 201 and/or the second computing device 204 may comprise, for example, relatively underpowered processors which provide rudimentary video and/or audio. Alternatively, the first computing device 201 and/or the second computing device 204 may, for example, comprise relatively powerful processors which provide highly realistic video and/or audio. As such, the first computing device 201 and/or the second computing device 204 may have varying levels of processing power.

The XR device 202 may provide a VR, AR, and/or MR environment to the user. In general, VR environments provide an entirely virtual world, whereas AR and/or MR environments mix elements in the real world and the virtual world. The XR device 202 may be a device specifically configured to provide an XR environment (e.g., a VR headset), or may be a combination of devices (e.g., a smartphone inserted into a headset) which, when operated in a particular manner, provides an XR environment. The XR device 202 may be said to be untethered at least in part because it may lack a physical connection to another device (and, e.g., may be battery powered). If the XR device 202 is connected to another device (e.g., the first computing device 201, a power source, or the like), it may be said to be tethered. Examples of the XR device 202 may include the VALVE INDEX VR device developed by Valve Corporation of Bellevue, Wash., the OCULUS QUEST VR device sold by Facebook Technologies, LLC of Menlo Park, Calif., and the HTC VIVE VR device sold by HTC Corporation of New Taipei City, Taiwan. Examples of the XR device 202 may also include smartphones which may be placed into a headset for VR purposes, such as the GEAR VR product sold by Samsung Group of Seoul, South Korea. Examples of the XR device 202 may also include the AR headsets sold by Magic Leap, Inc. of Plantation, Fla., the HOLOLENS MR headsets sold by Microsoft Corporation of Redmond, Wash., and NREAL LIGHT headsets sold by Hangzhou Tairuo Technology Co., Ltd. of Beijing, China, among others. Examples of the XR device 202 may also include audio-based devices, such as the ECHO FRAMES sold by Amazon, Inc. of Seattle, Wash. All such VR devices may have different specifications. For example, some VR devices may have cameras, whereas others might not. These are merely examples, and other AR/VR systems may also or alternatively be used.

The first computing device 201 may provide all or portions of an XR environment to the XR device 202, e.g., as used by a tethered OCULUS RIFT. For example, the first computing device 201 may provide a video data stream to the XR device 202 that, when displayed by the XR device 202 (e.g., through the display devices 203a), shows a virtual world. Such a configuration may be advantageous where the XR device 202 (e.g., the second computing device 204 that is part of the XR device 202) is not powerful enough to display a full XR environment. The first computing device 201 need not be present for the XR device 202 to provide an XR environment. For example, where the second computing device 204 is sufficiently powerful, the first computing device 201 may be omitted, e.g., an untethered OCULUS QUEST.

The display devices 203a may be any devices configured to display all or portions of an XR environment. Such display devices 203a may comprise, for example, flat panel displays, such as one or more liquid-crystal display (LCD) panels. The display devices 203a may be the same or similar as the display 106. The display devices 203a may be singular or plural, and may be configured to display different images to different eyes of a user. For example, the display devices 203a may comprise one or more display devices coupled with lenses (e.g., Fresnel lenses) which separate all or portions of the displays for viewing by different eyes of a user.

The audio devices 203b may be any devices which may receive and/or output audio associated with an XR environment. For example, the audio devices 203b may comprise speakers which direct audio towards the ears of a user. As another example, the audio devices 203b may comprise one or more microphones which receive voice input from a user. The audio devices 203b may be used to provide an audio-based XR environment to a user of the XR device 202.

The motion sensitive devices 203c may be any elements which receive input related to the motion of a user of the XR device 202. For example, the motion sensitive devices 203c may comprise one or more accelerometers which may determine when a user of the XR device 202 is moving (e.g., leaning, moving forward, moving backwards, turning, or the like). Three dimensional accelerometers and/or gyroscopes may be used to determine full range of motion of the XR device 202. Optional external facing cameras 203d may be used for 3D orientation as well. The motion sensitive devices 203c may permit the XR device 202 to present an XR environment which changes based on the motion of a user.

The cameras 203d may be used to aid in the safety of the user as well as the presentation of an XR environment. The cameras 203d may be configured to capture images of one or more portions of an environment around the XR device 202. The cameras 203d may be used to monitor the surroundings of a user so as to avoid the user inadvertently contacting elements (e.g., walls) in the real world. The cameras 203d may additionally and/or alternatively monitor the user (e.g., the eyes of the user, the focus of the user's eyes, the pupil dilation of the user, or the like) to determine which elements of an XR environment to render, the movement of the user in such an environment, or the like. As such, one or more of the cameras 203d may be pointed towards eyes of a user, whereas one or more of the cameras 203d may be pointed outward towards an environment around the XR device 202. For example, the XR device 202 may have multiple outward-facing cameras that may capture images, from different perspectives, of an environment surrounding a user of the XR device 202.

The position tracking elements 203e may be any elements configured to aid in the tracking of the position and/or movement of the XR device 202. The position tracking elements 203e may be all or portions of a system of infrared emitters which, when monitored by a sensor, indicate the position of the XR device 202 (e.g., the position of the XR device 202 in a room). The position tracking elements 203e may be configured to permit "inside-out" tracking, where the XR device 202 tracks the position of one or more elements (e.g., the XR device 202 itself, a user's hands, external controllers, or the like) or "outside-in" tracking, where external devices aid in tracking the position of the one or more elements.

The input/output 203f may be configured to receive and transmit data associated with an XR environment. For example, the input/output 203f may be configured to communicate data associated with movement of a user to the first computing device 201. As another example, the input/output 203f may be configured to receive information from other users of in multiplayer XR environments.

The second computing device 204 may be configured to provide, via the display devices 203a, the audio devices 203b, the motion sensitive devices 203c, the cameras 203d, the position tracking elements 203e, and/or the input/output 203f, the XR environment. The second computing device 204 may comprise one or more processors (e.g., a graphics processor), storage (e.g., that stores virtual reality programs), or the like. In general, the second computing device 204 may be powerful enough to provide the XR environment without using the first computing device 201, such that the first computing device 201 need not be required and need not be connected to the XR device 202. In other configurations, the second computing device 204 and the first computing device 201 may work in tandem to provide the XR environment. In other configurations, the XR device 202 might not have the second computing device 204, such that the first computing device 201 interfaces with the display devices 203a, the audio devices 203b, the motion sensitive devices 203c, the cameras 203d, the position tracking elements 203e, and/or the input/output 203f directly.

The above-identified elements of the XR device 202 are merely examples. The XR device 202 may have more or similar elements. For example, the XR device 202 may include in-ear EEG and/or HRV measuring devices, scalp and/or forehead-based EEG and/or HRV measurement devices, eye-tracking devices (e.g., using cameras directed at users' eyes, pupil tracking, infrared), or the like.

Figure 3:
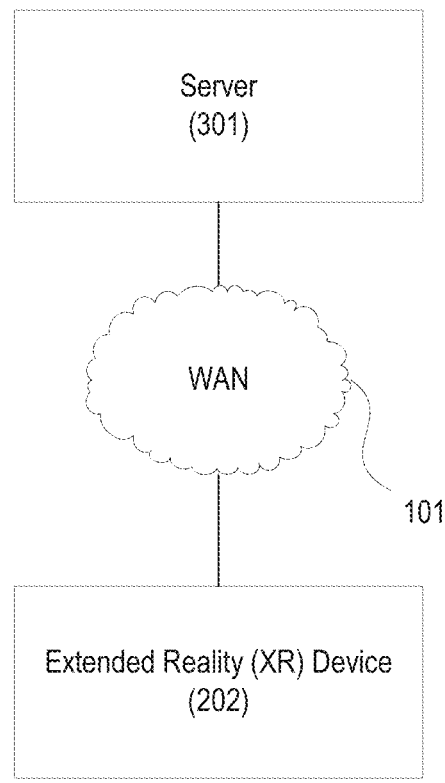
FIG. 3 depicts an XR device connected to a server via a network.

FIG. 3 shows the XR device 202 connected, via the network 101, to a server 301. The server 301 may be a computing device the same or similar as the devices 103, 105, 107, and 109. Additionally and/or alternatively, the server 301 may be the same or similar as the first computing device 201. The server 301 may be configured to generate all or portions of an XR environment displayed by the XR device 202. For example, the XR device 202 may receive, via the network 101, data (e.g., a video stream) from the server 301, and the data may comprise a virtual object which may be displayed in an XR environment. Advantageously, the server 301 may have superior computing power as compared to the XR device 202, such that content generated by the server 301 (e.g., virtual objects rendered by the server 301) may have a superior graphical quality as compared to the XR device 202.

Having discussed several examples of computing devices and XR devices which may be used to implement some aspects as discussed further below, discussion will now turn to remote rendering of reflections on objects in XR environments.

Rendering of XR Objects

Figure 4:
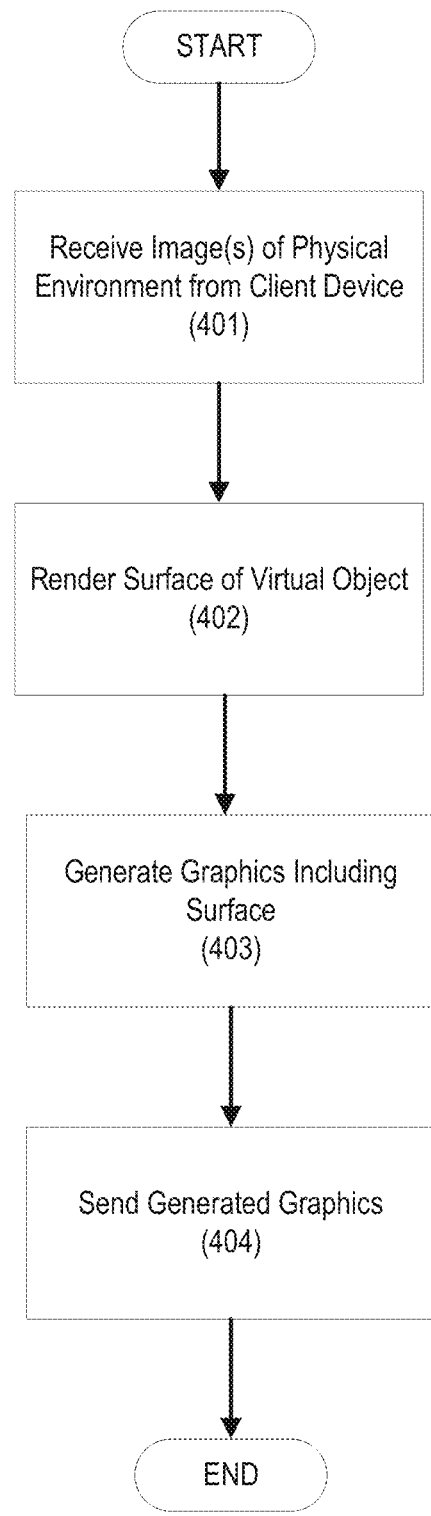
FIG. 4 depicts a flow chart for remotely rendering reflections on XR objects.

FIG. 4 depicts a flow chart for remotely rendering XR objects. The steps shown in FIG. 4 are illustrative, and numerous processes may occur before, between, and/or after any one of the steps depicted in FIG. 4. The steps shown in FIG. 4 may be performed by a computing device, such as the server 301, the first computing device 201, any one of the devices 103, 105, 107, and 109, and/or a computing device comprising one or more processors and memory storing instructions that, when executed by the one or more processors, cause the computing device to perform the steps of FIG. 4.

In step 401, images of a physical environment may be received from a client device. The client device may be, for example, the XR device 202, such that the images may have been captured using one or more of the cameras 203*d*. The images may be received via a network, such as the network 101. Receiving the images may comprise receiving a plurality of images and/or portions of images, each corresponding to different perspectives of the physical environment. For example, the XR device 202 may have multiple cameras, each pointing at different angles from the XR device 202, such that images captured by the cameras may be from a different perspective.

In step 402, at least one surface of a virtual object may be rendered based on the received images. The at least one surface of the virtual object may be rendered based on different views of the physical environment. The at least one surface may be configured to appear to reflect another object in the physical environment and from a point of view of the client device at a time the received images were taken. For example, the virtual object may be a cube with a mirrored finish, such that the cube may be rendered such that it appears to reflect different portions of the physical environment. As another example, the virtual object may be a virtual car that is configured to appear partially reflective, such that one or more surfaces of the virtual car may appear to reflect the physical environment.

A reflection, such as may be depicted with respect to one or more surfaces of a virtual object, may be a throwing back of light. From a visual perspective, such throwing back may comprise reproducing an object as if via a mirror or a mirrored surface. A reflection may distort, tint, or otherwise modify a depiction of another object. For example, a red-tinted mirrored surface might make a reflected object appear to be partially red or red-tinted. As another example, a textured or angled mirrored surface may make a reflected object appear to be distorted about one or more dimensions. In the case of a virtual object, the virtual object may be configured to appear to reflect other virtual objects and/or physical objects.

Rendering the at least one surface of the virtual object may comprise rendering a model of another object in the physical environment. The received images may depict one or more objects. The received images may be processed to identify physical objects in the images. For example, the received images may be processed to determine that one or more of the images shows a chair. Based on identifying the physical objects, a 3D model corresponding to the object may be retrieved from, e.g., a database. Such a database may store a plurality of 3D models of objects likely to be around a user. The retrieved 3D model may be rendered. As an example of this process, the received images indicate the presence of a nearby chair, then a 3D model of a chair may be rendered. In this manner, the reflection rendered on the at least one surface of the virtual object may be improved by more precisely rendering the object as it exists in 3D space. One or more models of potential objects in the physical environment may be stored. For example, if the XR device 202 is connected to or otherwise in communication with a game console likely to be in the same room as a player, then a 3D model of the game console may be stored such that modeling reflections of the game console may be improved.

Rendering the at least one surface of the virtual object may comprise determining whether a portion of another object in the physical environment is a light source. A light source may affect or otherwise change an appearance of a surface of a virtual object. The virtual object may be rendered to include this change in appearance and therefore provide a more realistic virtual object rendering. A virtual object, for example, can be rendered to provide an appearance of a beam of bright light that shines off of at least one surface of the virtual object. After determining that another object (or portion thereof) in the physical environment is a light source or other reflective surface, a ray may be traced from the another object to the surface of the virtual object. This ray tracing may be performed to determine, for example, a direction which the light shines. For example, the virtual object may be a mirror, and a user of the XR device 202 may rotate the virtual object to appear to reflect a beam of light from a real-world light source around an XR environment.

Rendering the at least one surface of the virtual object may comprise estimating and/or predicting one or more portions of the physical environment. The received images might not depict the entirety of the physical environment, such that determining how the physical environment would appear to reflect on the at least one surface of the virtual object may comprise predicting how an un-imaged portion of the physical environment looks. Such prediction may comprise use of a machine learning model trained using a history of indoor and outdoor environments. For example, a trained machine learning model may be configured to predict what one corner of a living room looks like based on images of the other three corners of the living room. Such prediction may comprise making predictions about the nature of an environment surrounding a user. For example, if the received images all show blank white walls around the client device, the prediction may involve assuming that an unseen part of the room is, like the visible portions of the room, also white.

In step 403, graphics which include the rendered at least one surface of the virtual object may be generated. Generating the graphics may comprise generating 2D or 3D images, whether static or video, comprising the virtual object. The graphics may depict the virtual object as reflecting all or portions of the physical environment. The graphics may include one or more transparencies, such that the graphics may be appended on top of physical objects. For example, if the virtual object is a reflective ball, then the graphics may be a square image depicting the ball and a plurality of transparent pixels around the ball.

In step 404, the generated graphics may be sent to the client device. The generated graphics may enable display of a computer generated environment on the client device. The computer generated environment may include the at least one virtual object with an appearance of a reflective surface. The generated graphics may comprise one or more images which may be transmitted to the client device. Additionally and/or alternatively, the generated graphics may comprise video, a 3D model, or the like. For example, the generated graphics may comprise a video stream corresponding to the virtual object.

The steps depicted in FIG. 4 may be repeated after a period of time, after motion of the client device, or the like. For example, another image of the physical environment may be received from the client device, and the another image may include views of the physical environment around the client device from a location within the physical environment than a location different than the one at which the image was taken. Such a circumstance may occur when a user turns their head (e.g., where the client device is a head-mounted XR device), moves about the physical space, or the like. An indication of motion of the client device may be received, and, based on the indication of motion of the client device, a request for the another image may be sent to the client device. In response, at least one surface of the virtual object may be rendered based on the views of the another image, updated graphics (e.g., that include the rendered at least one surface of the object based on the views of the physical environment) may be generated, and the updated graphics may be sent to the client device. In this manner, the reflection(s) on a virtual object may be updated to reflect changes in the physical environment about the user (e.g., furniture being moved, the user turning around, ambient light changes, or the like).

Figure 5:
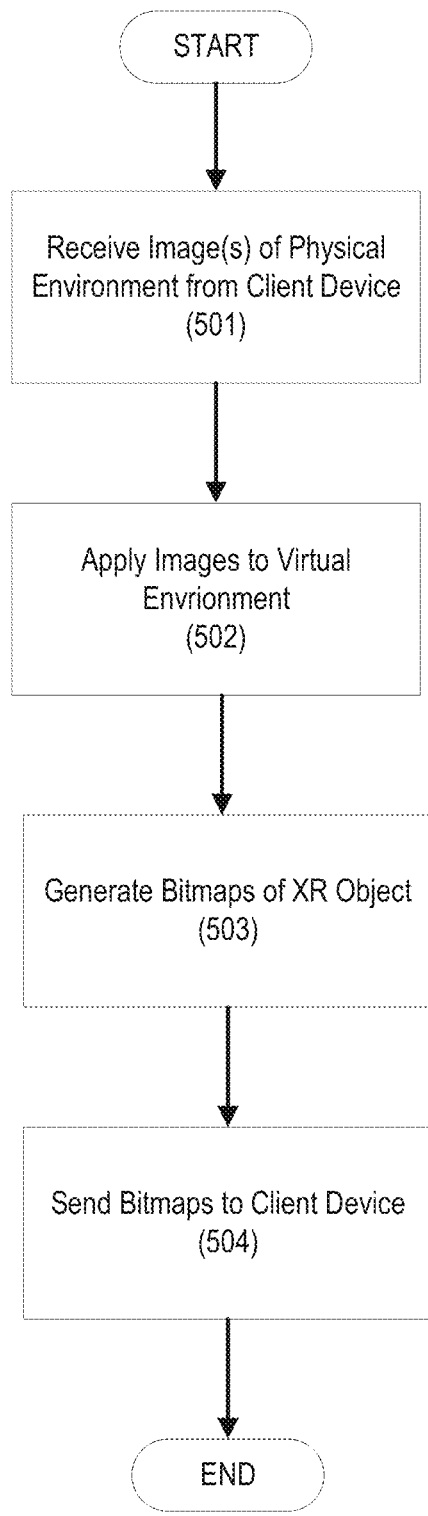
FIG. 5 depicts a flow chart for remotely rendering reflections on XR objects with a focus on applying received images to a virtual environment.

FIG. 5 depicts a flow chart for remotely rendering reflections on XR objects with a focus on how the images may be applied to a virtual environment. Like FIG. 4, the steps shown in FIG. 5 are illustrative, and numerous processes may occur before, between, and/or after any one of the steps depicted in FIG. 5. The steps shown in FIG. 5 may be performed by a computing device, such as the server 301, the first computing device 201, any one of the devices 103, 105, 107, and 109, and/or a computing device comprising one or more processors and memory storing instructions that, when executed by the one or more processors, cause the computing device to perform the steps of FIG. 5.

In step 501, images of a physical environment may be received from a client device. This process may be the same and/or similar as step 401 of FIG. 4.

In step 502, the received images may be applied to a virtual environment such that the virtual environment depicts the physical environment around the client device. For example, a bounding region (e.g., a bounding box, a bounding sphere, a skybox, or the like) may be generated, and the interior of the bounding region may be textured with all or portions of the received images. As another example, in a game engine, the interior of a skybox or bounding box may be textured using all or portions of the received images. Applying the received images may comprise modifying a perspective, size, or other properties of the received images. For example, if a bounding box is used, a perspective of the images may be tweaked or otherwise adjusted such that application of the images to the inner surfaces of the bounding box does not distort the images. Applying the received images may comprise predicting all or portions of the physical environment. For example, as also described above with respect to FIG. 4, unseen portions of the environment may be generated based on portions of the environment shown in the received images, and using, e.g., a machine learning model.

In step 503, one or more bitmaps of an XR object may be generated. Generating the one or more bitmaps may comprise rendering the XR object in the virtual environment and simulating reflections of the virtual environment on at least a portion of the XR object. For example, the XR object may be placed inside of a bounding box which has been textured based on the received images. In this manner, the XR object may appear to reflect at least a portion of the physical environment around the client device. Simulating the reflections of the virtual environment may comprise, as discussed above with respect to FIG. 4, rendering a model of an object in the physical environment around the client device. Simulating the reflections of the virtual environment may additionally and/or alternatively comprise, as also discussed above with respect to FIG. 4, determining that a portion of the virtual environment includes a light source and tracing a ray from the portion of the virtual environment to the at least the portion of the XR object.

In step 504, the generated bitmaps may be sent to the client device. This process may be the same or similar as step 404 of FIG. 4.

As with FIG. 4, the steps of FIG. 5 may be repeated based on, for example, movement of the client device, after a period of time, or the like. For example, an indication of motion of the client device may be received, and, in response to that indication, a request for one or more updated images may be transmitted. One or more updated images of the physical environment around the client device may be received from the client device, and a second virtual environment representing the physical environment around the client device may be generated. One or more second bitmaps of the XR object may be generated by rendering the XR object in the second virtual environment and simulating reflections of the second virtual environment on the at least the portion of the XR object. The one or more second bitmaps may be sent to the client device for rendering in the XR environment. In this manner, changes to the orientation of an XR device (such as the XR device 202) and/or the physical environment of the user may be used in the reflections shown on the XR object.

Figure 6A:
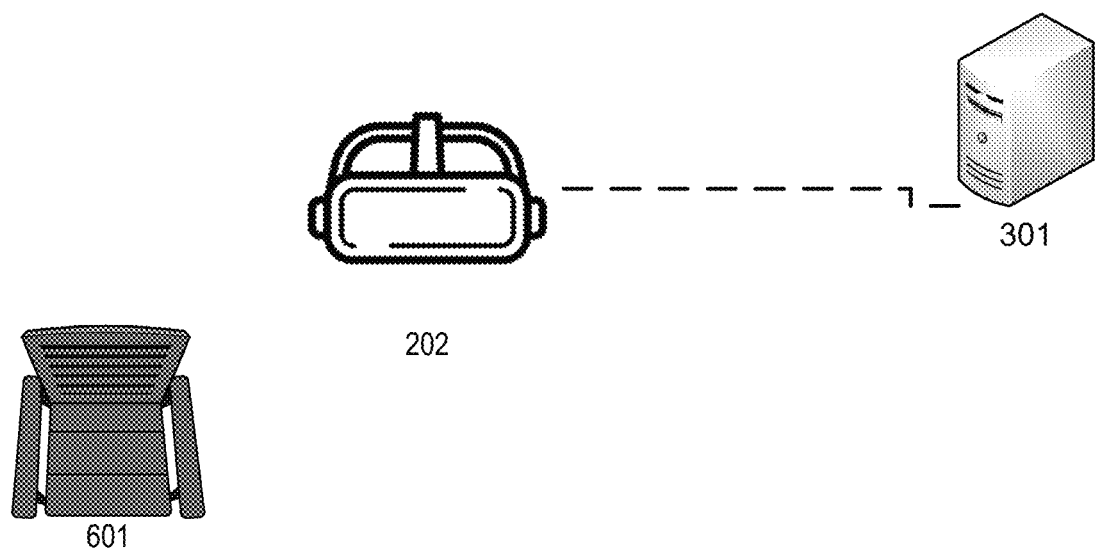
FIG. 6A shows an XR device in an XR environment.

FIG. 6A shows the XR device 202 in an XR environment and connected to the server 301. The XR device may be in an XR environment which includes a physical object, such as a chair 601. For example, FIG. 6A may represent a room in which a user is using the XR device 202 to access an XR environment. Though the server 301 is shown in FIG. 6A, the sever 301 may be hundreds or thousands of miles away. For example, the XR device 202 may be connected to the server 301 via one or more networks.

Figure 6B:
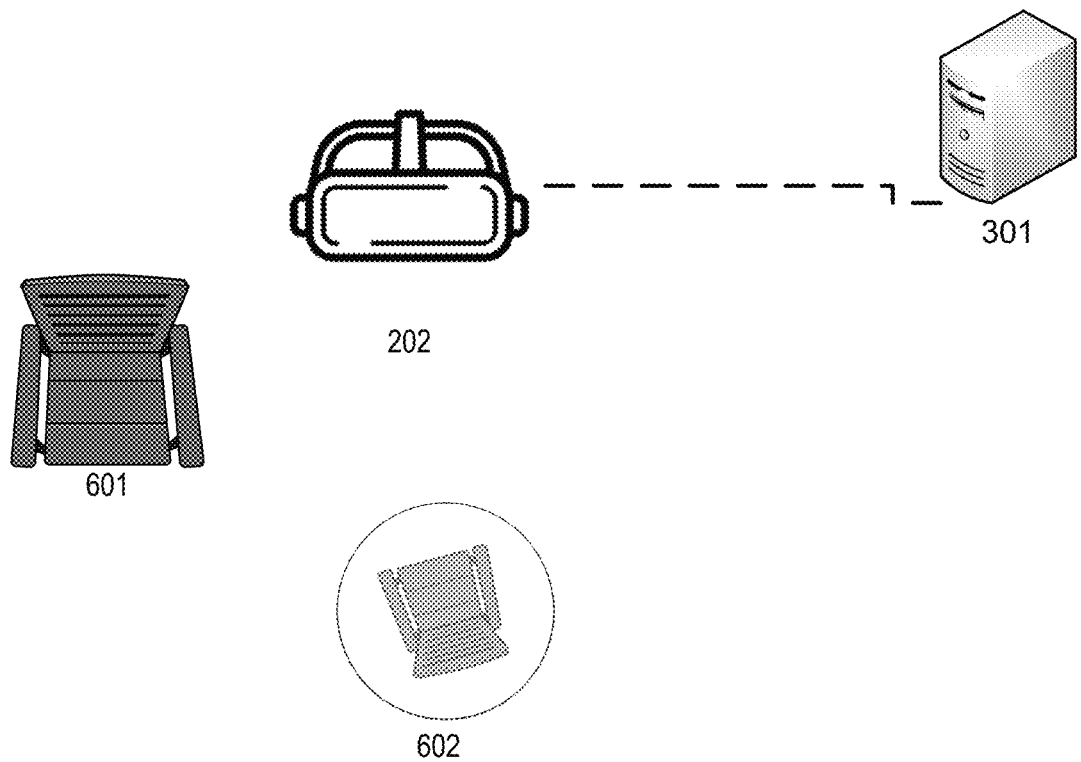
FIG. 6B shows an XR device in an XR environment with a virtual object reflecting a physical object.

FIG. 6B shows the XR device 202 showing a reflective surface 602 in the XR environment. The reflective surface 602 may be displayed on and/or with respect to a virtual object and may appear to reflect a physical object, such as the chair 601. The reflective surface 602 may have been generated by the server 301, and graphics representing the reflection shown on the reflective surface 602 may have been generated by the server 301 in accordance with the steps described in FIGS. 4 and 5. As such, the XR device 202 may show the reflective surface 602 in the virtual environment, but need not perform the processing steps required to show the reflection on the reflective ball 602.

The following paragraphs (M1) through (M13) describe examples of methods that may be implemented in accordance with the present disclosure.

(M1) A method comprising receiving, by a server and from a client device, an image of a physical environment, the image including different views of the physical environment around the client device; rendering, by the server, at least one surface of a virtual object based on the different views of the physical environment, the at least one surface including a reflection of another object of the physical environment from a view point of the client device at a time the image was taken; generating, by the server, graphics that include the rendered at least one surface of the virtual object of the received image; and sending, by the server, the generated graphics to the client device to enable display of a computer generated environment on the client device, the computer generated environment including the at least one virtual object with an appearance of a reflective surface.

(M2) A method may be performed as described in paragraph (M1) wherein rendering the at least one surface comprises: rendering a model of the another object of the physical environment.

(M3) A method may be performed as described in any one of paragraphs (M1) through (M2) wherein rendering the at least one surface of the virtual object comprises: determining, by the server, that a portion of the another object of the physical environment is a light source; and tracing a ray from the another object to the at least one surface of the virtual object.

(M4) A method may be performed as described in any of paragraphs (M1) through (M3) further comprising receiving, by the server and from the client device, another image of the physical environment, the another image including views of the physical environment around the client device from a location within the physical environment than a location different than the one at which the image was taken; rendering, by the server, the at least one surface of the virtual object based on the views of the another image; generating, by the server, updated graphics that include the rendered at least one surface of the object based on the views of the physical environment; and sending, by the server, the updated graphics to the client device.

(M5) A method may be performed as described in any of paragraphs (M1) through (M4) further comprising receiving, by the server and from the client device, an indication of motion of the client device; and sending, by the server and to the client device, a request for the another image.

(M6) A method may be performed as described in any of paragraphs (M1) through (M5) wherein receiving the image of the physical environment comprises: receiving a plurality of different portions of the image of the physical environment, each corresponding to a different view of the physical environment around the client device.

(M7) A method may be performed as described in any of paragraphs (M1) through (M6) wherein sending the generated graphics comprises sending, by the server and to the client device, the generated graphics as video.

(M8) A method comprising receiving, by a server and from a client device displaying an extended reality (XR) environment, one or more images of a physical environment around the client device; applying, by the server, the one or more images to virtual environment such that the virtual environment depicts the physical environment around the client device; generating, by the server, one or more bitmaps of an XR object by: rendering the XR object in the virtual environment; and simulating reflections of the virtual environment on at least a portion of the XR object so that the XR object appears to reflect at least a portion of the physical environment around the client device; and sending, by the server and to the client device, the one or more bitmaps for rendering in the XR environment on the client device.

(M9) A method may be performed as described in paragraph (M8), wherein simulating reflections of the virtual environment comprises rendering a model of an object in the physical environment around the client device.

(M10) A method may be performed as described in any one of paragraphs (M8) through (M9), wherein simulating the reflections comprises determining, by the server, that a portion of the virtual environment includes a light source; and tracing a ray from the portion of the virtual environment to the at least the portion of the XR object.

(M11) A method may be performed as described in any one of paragraphs (M8) through (M10), further comprising: receiving, by the server and from the client device, one or more updated images of the physical environment around the client device; generating, by the server, a second virtual environment representing the physical environment around the client device; generating, by the server, one or more second bitmaps of the XR object by: rendering the XR object in the second virtual environment; and simulating reflections of the second virtual environment on the at least the portion of the XR object; and sending, by the server and to the client device, the one or more second bitmaps for rendering in the XR environment.

(M12) A method may be performed as described in any one of paragraphs (M8) through (M11), further comprising receiving, by the server and from the client device, an indication of motion of the client device; and sending, by the server and to the client device, a request for the one or more updated images.

(M13) A method may be performed as described in any one of paragraphs (M8) through (M12), wherein generating the virtual environment further comprises: determining, by the server, that a first image of the one or more images of the physical environment around the client device represents a first portion of the environment; and estimating, by the server and based on the first image, a color of a second portion of the environment.

The following paragraphs (A1) through (A13) describe examples of apparatuses that may be implemented in accordance with the present disclosure.

(A1) A server comprising one or more processors and memory storing instructions that, when executed by the one or more processors, cause the server to receive, from a client device, an image of a physical environment, the image including different views of the physical environment around the client device; render at least one surface of a virtual object based on the different views of the physical environment, the at least one surface including a reflection of another object of the physical environment from a view point of the client device at a time the image was taken; generate graphics that include the rendered at least one surface of the virtual object of the received image; and send the generated graphics to the client device to enable display of a computer generated environment on the client device, the computer generated environment including the at least one virtual object with an appearance of a reflective surface.

(A2) A server as described in paragraph (A1) wherein the instructions, when executed by the one or more processors, cause the server to render the at least one surface by causing the server to: render a model of the another object of the physical environment.

(A3) A server as described in any one of paragraphs (A1) through (A2) wherein the instructions, when executed by the one or more processors, cause the server to render the at least one surface by causing the server to: determining, by the server, that a portion of the another object of the physical environment is a light source; and tracing a ray from the another object to the at least one surface of the virtual object.

(A4) A server as described in any of paragraphs (A1) through (A3) wherein the instructions, when executed by the one or more processors, further cause the server to receive, from the client device, another image of the physical environment, the another image including views of the physical environment around the client device from a location within the physical environment than a location different than the one at which the image was taken; render the at least one surface of the virtual object based on the views of the another image; generate updated graphics that include the rendered at least one surface of the object based on the views of the physical environment; and send the updated graphics to the client device.

(A5) A server as described in any of paragraphs (A1) through (A4) wherein the instructions, when executed by the one or more processors, further cause the server to receive, from the client device, an indication of motion of the client device; and send, to the client device, a request for the another image.

(A6) A server as described in any of paragraphs (A1) through (A5) wherein the instructions, when executed by the one or more processors, further cause the server to receive the image of the physical environment by causing the server to: receive a plurality of different portions of the image of the physical environment, each corresponding to a different view of the physical environment around the client device.

(A7) A server as described in any of paragraphs (A1) through (A6) wherein the instructions, when executed by the one or more processors, further cause the server to send the generated graphics by causing the server to send, to the client device, the generated graphics as video.

(A8) A server comprising one or more processors and memory storing instructions that, when executed by the one or more processors, cause the server to receive, from a client device displaying an extended reality (XR) environment, one or more images of a physical environment around the client device; apply the one or more images to virtual environment such that the virtual environment depicts the physical environment around the client device; generate one or more bitmaps of an XR object by: rendering the XR object in the virtual environment; and simulating reflections of the virtual environment on at least a portion of the XR object so that the XR object appears to reflect at least a portion of the physical environment around the client device; and send, to the client device, the one or more bitmaps for rendering in the XR environment on the client device.

(A9) A server as described in paragraph (A8), wherein the instructions, when executed by the one or more processors, further cause the server to simulate reflections of the virtual environment by causing the server to render a model of an object in the physical environment around the client device.

(A10) A server as described in any one of paragraphs (A8) through (A9), wherein the instructions, when executed by the one or more processors, further cause the server to simulate the reflections by causing the server to determine that a portion of the virtual environment includes a light source; and trace a ray from the portion of the virtual environment to the at least the portion of the XR object.

(A11) A server as described in any one of paragraphs (A8) through (A10), wherein the instructions, when executed by the one or more processors, further cause the server to: receive, from the client device, one or more updated images of the physical environment around the client device; generate a second virtual environment representing the physical environment around the client device; generate one or more second bitmaps of the XR object by: rendering the XR object in the second virtual environment; and simulating reflections of the second virtual environment on the at least the portion of the XR object; and send, to the client device, the one or more second bitmaps for rendering in the XR environment.

(A12) A server as described in any one of paragraphs (A8) through (A11), wherein the instructions, when executed by the one or more processors, further cause the server to receive, from the client device, an indication of motion of the client device; and send, to the client device, a request for the one or more updated images.

(A13) A server as described in any one of paragraphs (A8) through (A12), wherein the instructions, when executed by the one or more processors, further cause the server to generate the virtual environment by causing the server to: determine that a first image of the one or more images of the physical environment around the client device represents a first portion of the environment; and estimate, based on the first image, a color of a second portion of the environment.

The following paragraphs (CRM1) through (CRM13) describe examples of computer-readable media that may be implemented in accordance with the present disclosure.

(CRM1) A non-transitory computer-readable medium storing instructions that, when executed, cause a server to: receive, from a client device, an image of a physical environment, the image including different views of the physical environment around the client device; render at least one surface of a virtual object based on the different views of the physical environment, the at least one surface including a reflection of another object of the physical environment from a view point of the client device at a time the image was taken; generate graphics that include the rendered at least one surface of the virtual object of the received image; and send the generated graphics to the client device to enable display of a computer generated environment on the client device, the computer generated environment including the at least one virtual object with an appearance of a reflective surface.

(CRM2) A non-transitory computer-readable medium as described in paragraph (CRM1) wherein the instructions, when executed, cause the server to render the at least one surface by causing the server to: render a model of the another object of the physical environment.

(CRM3) A non-transitory computer-readable medium as described in any one of paragraphs (CRM1) through (CRM2) wherein the instructions, when executed, cause the server to render the at least one surface by causing the server to: determining, by the server, that a portion of the another object of the physical environment is a light source; and tracing a ray from the another object to the at least one surface of the virtual object.

(CRM4) A non-transitory computer-readable medium as described in any of paragraphs (CRM1) through (CRM3) wherein the instructions, when executed, further cause the server to receive, from the client device, another image of the physical environment, the another image including views of the physical environment around the client device from a location within the physical environment than a location different than the one at which the image was taken; render the at least one surface of the virtual object based on the views of the another image; generate updated graphics that include the rendered at least one surface of the object based on the views of the physical environment; and send the updated graphics to the client device.

(CRM5) A non-transitory computer-readable medium as described in any of paragraphs (CRM1) through (CRM4) wherein the instructions, when executed, further cause the server to receive, from the client device, an indication of motion of the client device; and send, to the client device, a request for the another image.

(CRM6) A non-transitory computer-readable medium as described in any of paragraphs (CRM1) through (CRM5) wherein the instructions, when executed, further cause the server to receive the image of the physical environment by causing the server to: receive a plurality of different portions of the image of the physical environment, each corresponding to a different view of the physical environment around the client device.

(CRM7) A non-transitory computer-readable medium as described in any of paragraphs (CRM1) through (CRM6) wherein the instructions, when executed, further cause the server to send the generated graphics by causing the server to send, to the client device, the generated graphics as video.

(CRM8) A non-transitory computer-readable medium storing instructions that, when executed, cause a server to: receive, from a client device displaying an extended reality (XR) environment, one or more images of a physical environment around the client device; apply the one or more images to virtual environment such that the virtual environment depicts the physical environment around the client device; generate one or more bitmaps of an XR object by: rendering the XR object in the virtual environment; and simulating reflections of the virtual environment on at least a portion of the XR object so that the XR object appears to reflect at least a portion of the physical environment around the client device; and send, to the client device, the one or more bitmaps for rendering in the XR environment on the client device.

(CRM9) A non-transitory computer-readable medium as described in paragraph (CRM8), wherein the instructions, when executed, further cause the server to simulate reflections of the virtual environment by causing the server to render a model of an object in the physical environment around the client device.

(CRM10) A non-transitory computer-readable medium as described in any one of paragraphs (CRM8) through (CRM9), wherein the instructions, when executed, further cause the server to simulate the reflections by causing the server to determine that a portion of the virtual environment includes a light source; and trace a ray from the portion of the virtual environment to the at least the portion of the XR object.

(CRM11) A non-transitory computer-readable medium as described in any one of paragraphs (CRM8) through (CRM10), wherein the instructions, when executed, further cause the server to: receive, from the client device, one or more updated images of the physical environment around the client device; generate a second virtual environment representing the physical environment around the client device; generate one or more second bitmaps of the XR object by: rendering the XR object in the second virtual environment; and simulating reflections of the second virtual environment on the at least the portion of the XR object; and send, to the client device, the one or more second bitmaps for rendering in the XR environment.

(CRM12) A non-transitory computer-readable medium as described in any one of paragraphs (CRM8) through (CRM11), wherein the instructions, when executed, further cause the server to receive, from the client device, an indication of motion of the client device; and send, to the client device, a request for the one or more updated images.

(CRM13) A non-transitory computer-readable medium as described in any of paragraphs (CRM8) through (CRM12), wherein the instructions, when executed, further cause the server to generate the virtual environment by causing the server to: determine that a first image of the one or more images of the physical environment around the client device represents a first portion of the environment; and estimate, based on the first image, a color of a second portion of the environment.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   receiving, by a server and from a client device, an image of a physical environment, the image including one or more views of the physical environment around the client device;
   identifying, based on the image of the physical environment, an object in the physical environment;
   retrieving, from a database and based on the identified object in the physical environment, a three-dimensional model corresponding to the identified object in the physical environment,
   rendering, by the server, at least one surface of a virtual object based on the three-dimensional model and the one or more views of the physical environment, the at least one surface including a reflection of:
      at least a portion of the three-dimensional model; and
      at least a portion of the image;
   generating, by the server, graphics that include the rendered at least one surface of the virtual object; and
   sending, by the server, the generated graphics to the client device to enable display of a computer-generated environment on the client device, the computer-generated environment including the at least one virtual object with an appearance of a reflective surface.

2. The method of claim 1, wherein rendering the at least one surface comprises:
   rendering, in a virtual reality environment, the three-dimensional model.

3. The method of claim 1, wherein rendering the at least one surface of the virtual object comprises:
   determining, by the server, that the identified object in the physical environment comprises a light source; and
   tracing a ray from the three-dimensional model to the at least one surface of the virtual object.

4. The method of claim 1, further comprising:
   receiving, by the server and from the client device, another image of the physical environment, the another image including views of the physical environment around the client device from a location within the physical environment different than a location at which the image was taken;
   rendering, by the server, the at least one surface of the virtual object based on the three-dimensional model and the views of the another image;
   generating, by the server, updated graphics that include the rendered at least one surface of the object based on the three-dimensional model and the views of the physical environment; and
   sending, by the server, the updated graphics to the client device.

5. The method of claim 4, further comprising:
   receiving, by the server and from the client device, an indication of motion of the client device; and sending, by the server and to the client device, a request for the another image.

6. The method of claim 1, wherein receiving the image of the physical environment comprises:
receiving a plurality of different portions of the image of the physical environment, each corresponding to a different view of the physical environment around the client device.

7. The method of claim 1, wherein sending the generated graphics comprises:
sending, by the server and to the client device, the generated graphics as video.

8. A server comprising:
one or more processors; and
memory storing instructions that, when executed by the one or more processors, cause the server to:
receive, from a client device, an image of a physical environment, the image including one or more views of the physical environment around the client device;
identify, based on the image of the physical environment, an object in the physical environment;
retrieve, from a database and based on the identified object in the physical environment, a three-dimensional model corresponding to the identified object in the physical environment;
render at least one surface of a virtual object based on the three-dimensional model and the one or more views of the physical environment, the at least one surface including a reflection of:
at least a portion of the three-dimensional model; and
at least a portion of the image;
generate graphics that include the rendered at least one surface of the virtual object; and
send the generated graphics to the client device to enable display of a computer-generated environment on the client device, the computer-generated environment including the at least one virtual object with an appearance of a reflective surface.

9. The server of claim 8, wherein the instructions, when executed by the one or more processors, cause the server to render the at least one surface by causing the server to:
render, in a virtual reality environment, the three-dimensional model.

10. The server of claim 8, wherein the instructions, when executed by the one or more processors, cause the server to render the at least one surface of the virtual object by causing the server to:
determine that the identified object in the physical environment comprises a light source; and
trace a ray from the three-dimensional model to the at least one surface of the virtual object.

11. The server of claim 8, wherein the instructions, when executed by the one or more processors, further cause the server to:
receive, from the client device, another image of the physical environment, the another image including views of the physical environment around the client device from a location within the physical environment different than a location at which the image was taken;
render the at least one surface of the virtual object based on the three-dimensional model and the views of the another image;
generate updated graphics that include the rendered at least one surface of the object based on the three-dimensional model and the views of the physical environment; and
send the updated graphics to the client device.

12. The server of claim 11, wherein the instructions, when executed by the one or more processors, further cause the server to:
receive, from the client device, an indication of motion of the client device; and
send, to the client device, a request for the another image.

13. The server of claim 8, wherein the instructions, when executed by the one or more processors, cause the server to receive the image of the physical environment by causing the server to:
receive a plurality of different portions of the image of the physical environment, each corresponding to a different view of the physical environment around the client device.

14. The server of claim 8, wherein the instructions, when executed by the one or more processors, cause the server to send the generated graphics by causing the server to:
send, to the client device, the generated graphics as video.

15. A method comprising:
receiving, by a server and from a client device displaying an extended reality (XR) environment, one or more images of a physical environment around the client device;
identifying, based on the one or more images of the physical environment, an object in the physical environment;
retrieving, from a databased and based on the identified object in the physical environment, a three-dimensional model corresponding to the identified object in the physical environment;
applying, by the server, the one or more images to a virtual environment such that the virtual environment depicts the physical environment around the client device;
generating, by the server, one or more bitmaps of an XR object by:
rendering the XR object in the virtual environment; and
simulating reflections of the virtual environment and the three-dimensional model on at least a portion of the XR object so that the XR object appears to reflect:
at least a portion of the three-dimensional model; and
at least a portion of the one or more images; and
sending, by the server and to the client device, the one or more bitmaps for rendering in the XR environment on the client device.

16. The method of claim 15, wherein simulating reflections of the virtual environment comprises:
rendering, in the virtual environment, the three-dimensional model.

17. The method of claim 15, wherein simulating the reflections comprises:
determining, by the server, that a portion of the virtual environment includes a light source; and
tracing a ray from the portion of the virtual environment to the at least the portion of the XR object.

18. The method of claim 15, further comprising:
receiving, by the server and from the client device, one or more updated images of the physical environment around the client device;
generating, by the server, a second virtual environment representing the physical environment around the client device;
generating, by the server, one or more second bitmaps of the XR object by:
rendering the XR object in the second virtual environment; and simulating reflections of the second virtual environment and the three-dimensional model on the at least the portion of the XR object; and sending, by the server and to the client device, the one or more second bitmaps for rendering in the XR environment.

19. The method of claim 18, further comprising:

receiving, by the server and from the client device, an indication of motion of the client device; and sending, by the server and to the client device, a request for the one or more updated images.

20. The method of claim 15, wherein generating the virtual environment further comprises:

determining, by the server, that a first image of the one or more images of the physical environment around the client device represents a first portion of the environment; and estimating, by the server and based on the first image, a color of a second portion of the environment.

* * * * *